United States Patent
Ma et al.

(10) Patent No.: US 11,031,048 B1
(45) Date of Patent: Jun. 8, 2021

(54) DEVICES WITH A SNAP-FIT ENGAGEMENT AND RELATED METHODS

(71) Applicant: Seagate Technology LLC, Cupertino, CA (US)

(72) Inventors: YiChao Ma, Singapore (SG); Christopher M. Woldemar, Singapore (SG); Lionel Young, Singapore (SG); Iraj Jabbari, La Jolla, CA (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 16/257,796

(22) Filed: Jan. 25, 2019

(51) Int. Cl.
| | | |
|---|---|---|
| *G11B 33/14* | (2006.01) | |
| *G11B 33/02* | (2006.01) | |
| *B23K 20/12* | (2006.01) | |
| *G11B 25/04* | (2006.01) | |
| *G11B 33/12* | (2006.01) | |

(52) U.S. Cl.
CPC ........ *G11B 33/1466* (2013.01); *B23K 20/122* (2013.01); *B23K 20/1225* (2013.01); *G11B 25/043* (2013.01); *G11B 33/022* (2013.01); *G11B 33/1486* (2013.01); *B23K 20/129* (2013.01); *B23K 20/1285* (2013.01); *G11B 33/125* (2013.01)

(58) Field of Classification Search
CPC ............ G11B 33/1466; G11B 33/1486; G11B 25/043; G11B 33/022; G11B 33/125; B23K 20/122; B23K 20/1225; B23K 20/129; B23K 20/1285; B23K 26/361; B23K 37/08; B23K 20/26; B23K 1/0012; B23D 79/021; B23P 15/00
See application file for complete search history.

(56) References Cited

U.S. PATENT DOCUMENTS

| | | | | |
|---|---|---|---|---|
| 5,025,335 | A * | 6/1991 | Stefansky | G11B 5/5526 360/137 |
| 6,683,747 | B2 | 1/2004 | Bernett | |
| 6,704,161 | B1 * | 3/2004 | Pham | G11B 33/08 360/97.19 |
| 7,271,513 | B2 * | 9/2007 | Xu | B29C 45/14778 264/272.13 |
| 7,522,375 | B2 | 4/2009 | Tsuda et al. | |
| 8,279,552 | B2 * | 10/2012 | Stipe | G11B 25/043 360/99.18 |
| 8,393,519 | B2 * | 3/2013 | Allehaux | B23K 20/1235 228/112.1 |
| 8,599,514 | B2 * | 12/2013 | McGuire, Jr. | G11B 25/043 360/97.15 |
| 8,603,571 | B2 * | 12/2013 | Carlson | C23C 26/00 427/11 |
| 8,699,179 | B1 * | 4/2014 | Golgolab | G11B 25/043 251/310 |
| 8,837,123 | B2 * | 9/2014 | Wang | H05K 5/04 361/679.01 |
| 8,908,319 | B1 | 12/2014 | Gustafson et al. | |
| 9,025,284 | B1 * | 5/2015 | Sill | G11B 25/043 360/265.7 |
| 9,073,149 | B2 * | 7/2015 | Raschke | B29C 66/112 |
| 9,190,115 | B2 * | 11/2015 | McGuire, Jr. | G11B 33/022 |

(Continued)

*Primary Examiner* — Brian E Miller
(74) *Attorney, Agent, or Firm* — Kagan Binder, PLLC

(57) ABSTRACT

Described are enclosures for electronic devices; the enclosures include a cover, a base, and a snap-fit engagement between the cover and the base; also described are methods of preparing the devices.

16 Claims, 7 Drawing Sheets

(56) References Cited

U.S. PATENT DOCUMENTS

| | | | | |
|---|---|---|---|---|
| 9,208,825 | B1* | 12/2015 | Gustafson | G11B 33/1486 |
| 9,536,572 | B2* | 1/2017 | Lapp | H02K 5/12 |
| 10,020,011 | B2 | 7/2018 | Cheng et al. | |
| 10,442,030 | B2* | 10/2019 | Severson | B23K 20/129 |
| 10,566,032 | B2* | 2/2020 | Coffey | B23K 33/004 |
| 10,569,356 | B1* | 2/2020 | Coffey | B23P 15/00 |
| 10,596,658 | B1* | 3/2020 | Coffey | C22C 38/02 |
| 2007/0064403 | A1* | 3/2007 | Badarinarayan | B23K 20/1265 361/796 |
| 2012/0275105 | A1* | 11/2012 | McGuire, Jr. | G11B 25/043 361/679.33 |
| 2012/0275287 | A1* | 11/2012 | McGuire, Jr. | G11B 25/043 369/75.11 |
| 2017/0062019 | A1* | 3/2017 | Severson | G11B 33/1486 |
| 2017/0308114 | A1* | 10/2017 | Fitzgerald | G06F 1/16 |
| 2018/0047421 | A1 | 2/2018 | Adachi et al. | |
| 2019/0076957 | A1* | 3/2019 | Severson | B23K 20/129 |

\* cited by examiner

DEVICES WITH A SNAP-FIT ENGAGEMENT AND RELATED METHODS

FIELD

The invention relates to electronic devices such as hard disk drives that include a base, a cover, and a releasable and temporary snap-fit engagement between the base and the cover.

BACKGROUND

Electronic devices such as data storage devices (e.g., hard disk drives or "HDDs"), solid state memories, microelectronic devices, and computers (e.g., personal computers, cell phones, tablets, laptops, etc.) perform essential functions in today's digital information-intensive world. As our reliance on these devices increases, so do the performance requirements of these devices, including their combined speed and reliability.

To achieve good performance and reliability of certain types of advanced electronic devices, e.g., hard disk drives, certain examples of these devices are constructed to include an enclosure that is hermetically sealed to contain a non-air atmosphere, for example a low density atmosphere such as a concentrated helium atmosphere. There are various benefits to operating a hard disk drive in a low density atmosphere. As one benefit, a low density atmosphere can reduce the amount of drag force that affects a spinning disk or a stack of closely-spaced spinning disks. The reduced amount of drag can significantly reduce the amount of power required to cause a disk stack to spin. Also, a low density atmosphere can reduce the amount of unwanted, non-rotational movement or "flutter" that occurs in a spinning disk and a disk suspension during use. Reducing un-wanted motion of a disk or disk suspension can allow adjacent disks of a disk stack to be placed more closely together, which increases areal density (a measure of the quantity of information bits that can be stored on a given area of disk surface) by enabling a narrower data track pitch.

Many commercial hard disk drive products that include a low density interior atmosphere are manufactured to include two separate covers over an interior cavity that contains the working components of the hard disk drive device. A first cover is located immediately above the cavity of the base, to enclose the cavity of the base and its contained working components. This cover, sometimes referred to as an "internal" cover or a "process" cover, is important during manufacturing the device to allow in-process performance testing of internal components of the device in the presence of a low density atmosphere. In specific, during assembly of a hard disk drive, after interior components of the hard disk drive are sufficiently in place to allow for their performance testing, the process cover is installed over the device interior in a non-permanent manner and the interior is filled with helium. With this first cover in place and the interior atmosphere filled with helium, the interior components can be tested for acceptable performance.

A second cover used in many commercial devices is placed outside of the process cover, and is referred to as an "outer" cover. The outer cover is attached to the device over the process cover, to enclose the process cover, and is secured to the device in a substantially permanent manner, e.g., by welding. The outer cover is not installed until after the performance testing. If the testing shows that the drive is somehow defective, i.e., fails a performance test, the non-permanent first cover can be easily removed and the drive can be fixed by replacing or repairing an internal working component. Then, after the drive is fixed, the first (inner, process) cover can be again placed over the cavity, the interior can be filled with helium, and the device can be re-tested. Only after the device successfully passes all necessary performance testing will the second cover (referred to as an "outer cover") be permanently placed over the process cover to form a permanent and hermetic seal, e.g., by welding.

A step of repairing or replacing a faulty internal component of a hard disk drive after performance testing is referred to as a "rework" step. According to previous manufacturing methods, testing a device while the device includes only the non-permanent process cover, followed by a rework step if necessary based on performance testing, is considered to be efficient for its ability to avoid waste. In the event that an in-process device does not pass a performance test, the non-permanent process cover can be easily removed and the disk drive can be repaired. A faulty disk drive can be tested and fixed before permanently placing the final cover on the device. In this way, the use of a first (process) cover and a second (outer) cover can reduce manufacturing cost by reducing waste, meaning that a defective device can be fixed ("reworked") and not discarded. But, while the use of both the inner cover and the outer cover can reduce waste, the need for two separate cover structures adds to material costs, as well as to the complexity of the product device and its manufacturing.

A more desirable design, if possible, would be to have just one single cover that encloses the base and the internal components of a hard disk drive in first a non-permanent manner for processing and testing, and then in a final and permanent manner. A single cover that would fit these requirements must be capable of sealing the device in a non-permanent manner for performance testing, and be easily removable for reworking, if necessary. The cover would be placeable over the device for filling the interior with a low density atmosphere such as helium, and for performance testing. If the device fails performance testing, the cover could be easily removed for reworking, e.g., fixing or replacing a faulty internal component. When the device passes necessary performance testing, the single cover must be capable of being permanently secured to the device, e.g., at the base, such as by welding, to form a permanent and hermetic seal.

SUMMARY

Hard disk drives that include a low density interior atmosphere require a device structure that maintains a low density atmosphere within the device interior for a period of use that is expected for the device. The device must also be designed to allow for performance testing of the product, during manufacturing, with an interior that contains the low density atmosphere. Preferably, if an in-process device fails a performance test, the device can be repaired ("reworked"), instead of being discarded.

The following description relates to electronic devices that include a cover and a base, with a releasable, snap-fit engagement between the cover and the base. The cover can be used as a single cover of an electronic device, and is capable of sealing the device (in a manner that contains a helium atmosphere) in a non-permanent manner for a desired purpose or amount of time, e.g., to carry out performance testing of the device. If a device fails a performance test, the snap-fit engagement can be dis-engaged, and the removable cover can be removed from the base without damaging the base or the device, preferably without damaging the cover. The device can be "re-worked," meaning repaired, by replacing or repairing any faulty internal component of the device. These testing and reworking steps can be performed as many times as needed for the device to pass necessary testing. Upon successfully passing all required performance testing, the cover can be permanently secured to the base (with the device containing the low density atmosphere), e.g., by welding, especially by friction stir welding, to form a permanent and hermetic seal.

As presented in the following description, Applicant has identified example devices that include a single cover that is capable of containing a low density atmosphere to allow internal components of the device to be tested with the low density atmosphere present at the interior, but that can also be easily removed to allow for reworking of the device if necessary. The single cover can be used during assembly of the device for performance testing, is removable is a rework step is necessary, and also can be permanently attached as a final outer cover. During assembly, the single cover can be removed if needed, for reworking. Upon the device passing necessary performance testing, the single cover can be processed, e.g., by welding, to permanently secure the single cover to the device, e.g., at the base, to form a hermetic seal that holds a low density atmosphere within the interior of the device for an extended period of use.

In one aspect, the invention relates to an enclosure that includes a metal base, a cover, and a snap-fit engagement between the cover and the base. The base includes: a horizontal bottom and a base cavity defined by the bottom and vertical base sidewalls at a base perimeter; and an outer sidewall surface extending along the base perimeter. The cover is located over the base to enclose the base cavity and define an interior. The cover includes a horizontal top portion extending over the base and a lip at a cover perimeter. The lip extends in a vertical direction relative to the horizontal top portion and includes a lower lip portion that contacts the outer sidewall surface when the cover is installed over the base. The snap-fit engagement is between the lip and the outer sidewall surface.

In another aspect, the invention relates to a method of closing an enclosure of an electronic device. The enclosure includes: a metal base comprising: a horizontal bottom and a base cavity defined by the bottom and vertical base sidewalls at a base perimeter, and an outer sidewall surface extending along the base perimeter. The enclosure also includes a cover located over the base to enclose the base cavity and define an interior, the cover including a horizontal top portion extending over the base and a lip at a cover perimeter, the lip extending in a vertical direction relative to the horizontal top portion, the lip including a lower lip portion that contacts the outer sidewall surface when the cover is installed over the base. The device includes a snap-fit engagement between the lip and the outer sidewall surface. The method includes installing the cover over the base to form the snap-fit engagement.

In another aspect the invention relates to a method of forming a friction stir weld on an enclosure. The enclosure includes a base and a cover. The base includes: a horizontal bottom and a base cavity defined by the bottom and vertical base sidewalls at a base perimeter; an outer sidewall surface extending along the base perimeter that includes a shoulder, an upper sidewall surface above the shoulder, and a lower sidewall surface below the shoulder, the shoulder comprising a lower portion of the upper sidewall surface connecting to a horizontal shoulder surface at an interior shoulder corner, the horizontal shoulder surface extending horizontally from the interior shoulder corner to an exterior shoulder corner, and an upper portion of the lower sidewall surface extending vertically from the exterior shoulder corner. The cover is located over the base to enclose the base cavity and includes a horizontal top portion extending over the base and a lip at a cover perimeter, the lip extending in a vertical direction relative to the horizontal top portion, the lip including a lower lip portion that contacts the shoulder to form a joint when the cover is installed over the base. The enclosure also includes a snap-fit engagement between the lower lip portion and the lower portion of the upper sidewall. The method includes contacting the joint with a rotating friction stir weld tool.

Figure 1A:
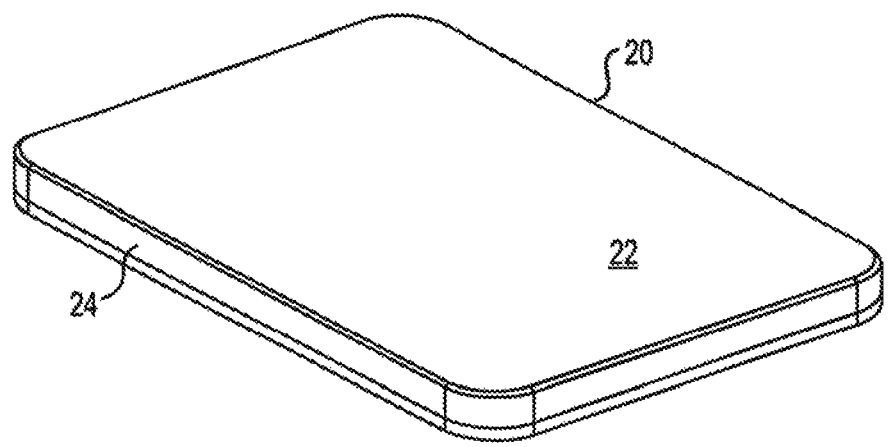
FIGS. 1A, 1B, 1C, 1D, and 1E illustrate features of assemblies as described, including a cover and a base.

All drawings are schematic and not to scale.

DETAILED DESCRIPTION

The invention relates to enclosures that include two metal components that are useful, when assembled, as an enclosure for an electronic device. The two metal components include a "snap-fit" engagement at a perimeter of the enclosure that allows the two metal components to be temporarily assembled and optionally dis-assembled, as desired, during manufacturing, such as after performance testing, to allow for a rework or repair step if necessary. The invention also relates to electronic devices (e.g., hard disk drives) that include the enclosure having a snap-fit engagement, and related methods of preparing electronic devices that involve efficiencies that result from the use of the snap-fit engagement. The invention still further relates to a base of an assembly either individually or in combination with the cover; methods of assembling the two metal components to form an assembly in the form of an enclosure with a joint that includes a temporary snap-fit engagement that may be in an un-welded state or in a welded state; methods of forming a weld at a joint of an assembly as described; and a welded (post-welded) assembly.

The two metal components can be a metal base and an opposed metal cover of an electronic device. The cover includes a horizontal (flat, planar) top portion and a vertical (meaning at least approximately or substantially vertical) lip that extends from the perimeter of the horizontal portion in a vertical (downward) direction relative to the horizontal top portion. The base and the cover can be placed adjacent to each other (in an opposed arrangement) in an assembled condition that includes the base and the cover contacting each other at each of their respective perimeters along an unwelded joint, e.g., in an unwelded condition with the cover secured to the base by the snap-fit engagement, or along a welded joint (in a welded condition), to form an enclosure having an interior.

As contemplated by the Applicant, and as presented herein, the assembly may be in an assembled and pre-welded form, or in a posted-welded form. Specifically, an assembly may include the base and the cover assembled as an enclosure that includes a joint at a perimeter of the enclosure, wherein the base and cover are held together (removably) at the joint by the snap-fit engagement in the absence of (i.e., prior to forming) a friction stir weld (also without the need for, preferably exclusive of, any other mechanical fastener, any adhesive, or other structure or material other than the snap-fit engagement acting to hold the cover to the base). Alternately an assembly may be a welded or "post-welded" assembly of the base and cover after a weld has been formed at the joint.

A metal base and the metal cover as described include a snap-fit engagement that allows the cover to be placed temporarily but securely over the base, without any other fastener, adhesive, or the like. The snap-fit engagement can be sufficient to allow the device interior to be filled with helium or another low density gas and then for the device to be tested for its performance, e.g., for electronic performance testing of internal components such as read and write performance of a hard disk drive. The snap-fit engagement is an engagement that allows the cover to be placed over the base to temporarily couple the cover to the base by application of pressure (e.g., finger pressure), to form a temporary but secure and air-tight seal. The assembled cover and base form a closed snap-fit engagement that is "air-tight," at least for a time needed for performance testing of interior components with a low density atmosphere contained at the interior of the device. For example, the snap-fit engagement between the base and the cover, when the base and the cover are engaged with the cover placed over the base, can produce a seal between the base and the cover that is effective to contain a low density atmosphere (e.g., concentrated helium) at the interior for a period sufficient to allow for performance testing of the electronic device; e.g., for a period of at least 2, 6, 12, 24, or 48 hours.

Advantageously, a snap-fit engagement as described allows for manufacturing efficiency and cost reductions by allowing for testing of internal components of a device that includes the enclosure, followed by optional reworking if necessary, before the cover is finally and permanently secured to the base with a hermetic seal. If during performance testing the device is found to be faulty, the snap-fit engagement allows for the cover to be removed from the base to expose the interior components and to allow for any needed repair or replacement of one or more interior components. Preferably, the cover can be manually removed from the base by disengagement of the snap-fit engagement, if desired, without permanently damaging or deforming the metal base and preferably (though not necessarily) without permanently damaging or deforming the metal cover. Preferably, the cover can be removed from the base in a condition that will allow both the cover and the base to be used again following any needed repair or replacement of one or more internal components of the device.

According to example snap-fit engagements, the base and the cover are mechanically coupled via opposed extension- and-recess-type connecting structures, with one structure on each of the cover and the base at opposed and aligned locations of the cover and the base with the cover placed over the base in an assembled condition. For example, the base may include an extension-type connector that may be mechanically engaged with a complementary recess-type connector of the cover when the cover is placed over the base. Alternately, the cover may include the extension-type connector and the base may include the complementary recess-type connector.

The recess- and extension-type connectors may be of any shape, size, and relative dimensions that will be suitable to provide a temporary but secure snap-fit engagement as described herein. In example embodiments, the extension-type connector (also referred to as a "male" component of the snap-fit engagement) may include a ridge, extension, or other surface that protrudes from a surface of the cover or the base. The extension can be of any cross-sectional shape and size that will securely engage a recess of the opposed surface. Examples include rounded or angled structures such as a jagged, "tooth-shaped" structure; a saw-blade structure; a square or rectangular shaped structure; a hemispherical structure; or any otherwise angled, rounded, or geometrical structure.

An extension-type connector can be considered to have a "width," measured as a maximum distance to which the extension structure extends (horizontally) from a substantially flat or planar surface of a base or a cover, and a "height" measured as a vertical dimension of the structure along the substantially flat or planar surface and substantially perpendicular to the width. The size (height and width) of an example extension structure can be sufficient to allow a secure engagement between the two opposed surfaces of the snap-fit engagement. Examples of useful widths of an extension connector can be in a range from 0.05 to 25 mils, such as from 0.1 to 10, 15, or 20 mils. Examples of useful heights can be in a range from 0.1 to 40 mils, such as from 0.5 to 20, 25, or 30 mils. Examples of heights and widths of a recess connector can be in these same ranges.

A cross-sectional shape and size of the recess can be any that allow for the extension connector to securely fit within the recess connector to provide a desired temporary snap-fit engagement between the two opposed structures. Examples include a groove, channel, slot, or depression that extends along a perimeter of the base or the cover. The recess structure may be approximately or exactly the same shape and size but in an opposite direction relative to the extension structure (i.e., may be complementary to the extension structure), or may be a different shape that is larger than the size of the extension structure and includes at least one surface that engages an opposing surface in a manner that causes the extension structure to be securely held by, e.g., snapped into, the recess structure upon placement of the cover over the base.

Figure 1B:
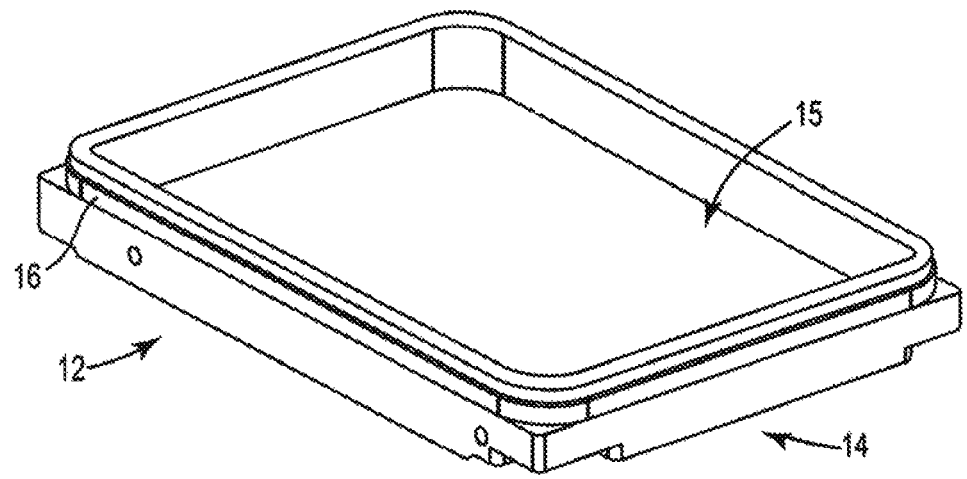
Figure 1C:
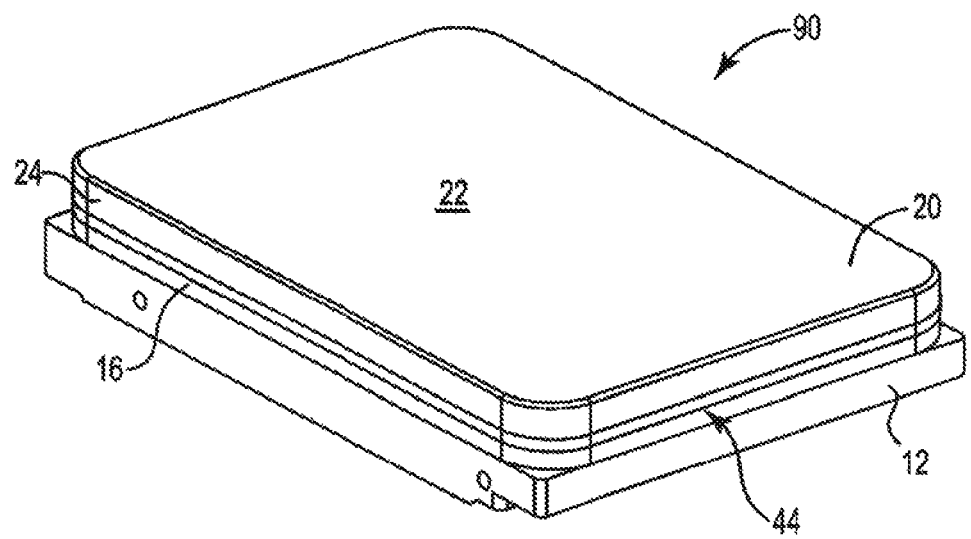
Figure 1D:
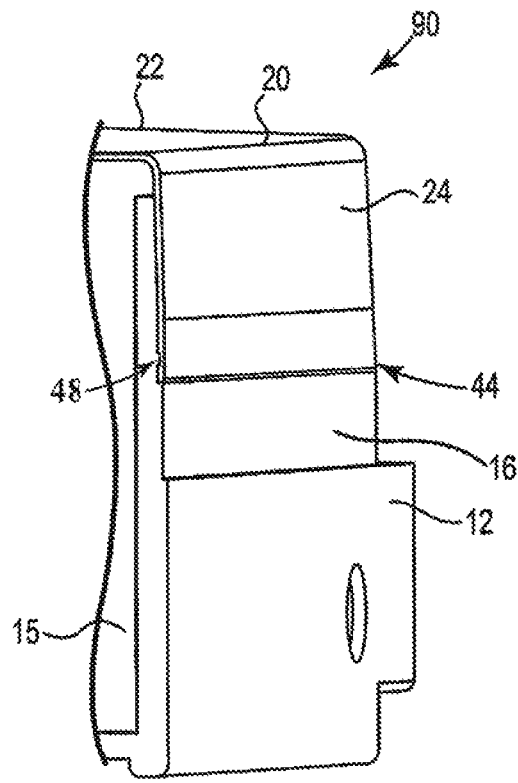
Figure 1E:
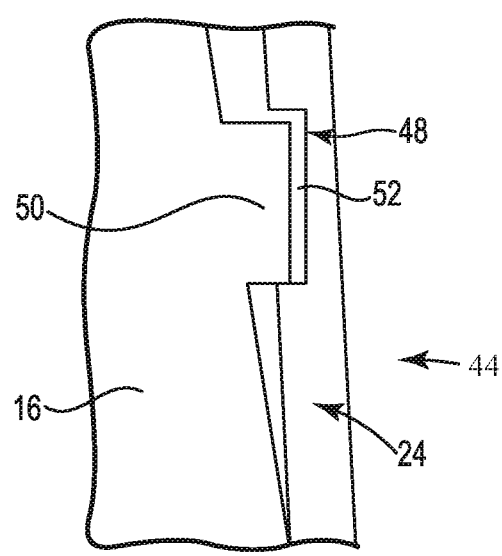

With reference to the example snap-fit engagement shown at FIG. 1E, base sidewall 16 includes an exterior surface that includes extension connector 50. Cover 24 includes an interior surface having recess connector 52. Each of the extension connector and the recess connector extends substantially or entirely around a perimeter of the exterior surface of base sidewall 16, as well as the perimeter of cover 24. According to the present description, cover 24 can be placed over a base structure that includes base sidewall 16 in a manner to cause recess connector 52 to become fitted over extension connector 50 to form snap-fit engagement 48.

An electronic device as described can include only one single cover, i.e., the cover as described, which includes a snap-fit engagement with the base, to enclose the interior and internal components of an electronic device. Useful and preferred devices do not require and can preferably exclude any other cover, such as an internal, removable cover of the type sometimes referred to as a "process" cover. Previous hard disk drive devices that include a low density atmosphere have included a removable process cover at an internal location of the device between the base and a second (outer) cover. The process cover of these devices, because it is removable, allows for a completed or semi-completed device to be filled with helium and performance tested with a helium interior atmosphere, and if necessary allows for removal of the process cover and an optional re-work step if necessary.

A process cover of past devices might also be used as a location of structural support for one or more internal components of a hard disk drive, such as for providing support to an actuator assembly, a top pole of an actuator assembly, or to a fixed ("tight") shaft or to a rotating shaft of a disk stack, rotating shaft motor, or any form of a fixed or rotating hub or shaft of a hard disk assembly. For example, a previous hard disk drive that includes an internal process cover and a second (outer) cover may include one or more holes in the process cover through which a screw or other fastener is passed and secured to an interior structure such as a hub or shaft of a disk stack or motor, a pole of an actuator assembly, or another structure of an actuator assembly.

In comparison to previous devices that include a process cover with one or more openings adapted to work with a fastener to provide structural support for an interior component, a device as presently described can include only a single cover; the single cover does not require and can preferably exclude any openings that are adapted to allow for passage of a fastener such as a screw that also engages and provides support for an interior component such as one or more of a hub or shaft of a hard disk assembly or a motor, or a pole or other structure of an actuator assembly.

As an alternative to supporting an actuator assembly or a pole of an actuator assembly by passing a screw or other fastener through a process cover, and securing the screw to the actuator assembly or pole, a device of the present description can include an internal screw that secures the actuator assembly or a pole of the actuator assembly to the base without passing through a cover, i.e., that is located entirely within the interior space enclosed by the cover. The screw need not pass through an internal process cover or the single outer cover of the present description.

As an alternative to supporting a hub or shaft (e.g., a fixed or rotating motor shaft) of a disk stack by passing a screw or other fastener through a process cover and securing the screw to the hub, a device as described herein can include an internal structure such as a "brace" that extends from the hub of a hard disk assembly to a base sidewall and is secured to each of the hub and the sidewall. The brace may be substantially rigid and strong, e.g., made of metal, ceramic, or rigid plastic or another polymer with optional reinforcement. The brace may be a substantially flat metal plate, arm, connector or other rigid piece that is located completely within the interior of the device, and that can be secured at two or more interior locations by any type of fastener, such as a screw. The brace may be secured at one internal location to a base sidewall, and at a second internal location to a hub of the disk stack. Alternately or in addition, a brace may be secured to another internal component such as the actuator or a top pole of an actuator. In each instance, the brace can be secured to the internal component in a manner that provides an increased amount of structural support to the component to prevent movement of the component.

While the single outer cover of the present description does not require and can specifically exclude any holes, openings, or apertures that allow for a fastener such as a screw to be passed through the cover to contact and provide structural support to an internal component of a device, an opening may optionally be present in the cover that will allow for a gaseous atmosphere to be removed from or introduced into the interior of the device. A "helium refilling" opening can be an opening in the cover through which a gaseous atmosphere at an interior of the device can be removed, i.e., evacuated, and through which a replacement gaseous atmosphere such as helium or another low density gas may be introduced.

Thus, an example assembly can be a hermetically-sealed enclosure of an electronic device, e.g., a hermetically-sealed hard disk drive as primarily described herein, or a precursor thereof. The cover and the base can be held together temporarily by the snap-fit engagement, and an original air atmosphere at the interior of the enclosure can be evacuated (e.g., through the "refilling" opening) and replaced with a low density atmosphere such as a concentrated helium atmosphere (e.g., a gaseous atmosphere of at least 70, 80, 90, 95, or at least 99 percent helium). The device, i.e., internal components of the device, can be tested for electronic performance requirements; the cover can be removed if necessary for reworking; or, if the device passes the electronic performance test the cover can be permanently secured to the base, such as by welding, e.g., friction stir welding.

The cover of the device is shaped to fit over the base, to engage the base at the base sidewalls, to enclose the base interior, and to include a recess connector or an extension connector as described. A cover can include a substantially flat or planar top portion, with a vertically-extending lip located at the perimeter of the top portion. An inner surface of the vertically-extending lip includes the recess connector or extension connector of the snap-fit engagement. The cover may be made of any useful metal material, e.g. aluminum or an aluminum alloy. The process for preparing the cover may be any, as desired, such as by being forged, extruded, cast, machined, stamped, etc. As an example, a useful cover can be made of an aluminum alloy, for example a 5000 series or 6000 series aluminum alloy, and may be prepared by stamping. When the cover is prepared by one of these or another method, an extension connector or a recess connector may be incorporated into the cover at a desired location, such as at an interior surface of a vertically-extending lip.

A thickness of a cover, e.g., a thickness in a z-dimension (in a height direction) of a top portion of a cover, alternately a thickness in an x- or y-dimension measured at a vertically-extending lip, may be within a useful range that provides a cover having desired rigidity and strength, and that is also capable of being permanently attached to the base by a useful technique such as by welding, e.g., friction stir welding. A preferred cover material may be relatively thin, because a thinner cover material can allow for a larger interior space within an enclosure formed from the cover, meaning a larger space for interior items such as magnetic recording disks. However, a thinner cover material may be more difficult to process by welding, especially by friction stir welding, compared to a relatively thicker cover material. A range of thicknesses that can be useful or preferred is from 10 mils to 50 mils, e.g., from 10 mils to 40 mils (but a thickness outside of these ranges can also be useful). Preferably, the entire cover, including the vertically-extending lip along the perimeter of the cover, as well as the flat upper portion, has a thickness that is relatively uniform and in a range from 10 mils to 40 mils or 50 mils thick. In preferred examples of assemblies as described, a thickness of a horizontal shoulder surface that engages a lip end portion at a joint can also be within this range and can be approximately equal to the thickness of the lip at the lip end portion.

A base of a device generally includes an interior space or cavity defined by a horizontal (substantially flat or planar) bottom that includes a perimeter, and by vertically-extending base sidewalls that extend from the base around the entire perimeter of the base in a vertical direction relative to the horizontal bottom. The base may be constructed of any useful metal material and may have any general or specific form consistent with the present description. Example base structures may be made of a metal alloy such as an aluminum alloy, for example a 4000 series or 6000 series aluminum alloy.

The base can be of any useful form, such as being constructed of a single integral piece or two or more pieces that are secured (e.g., welded) together. The process for preparing the base may be any, as desired, such as by being forged, extruded, cast, machined, stamped, etc. During the method of preparing the base, an extension structure or a recess structure of a snap-fit engagement may be incorporated into the base at a desired location around a perimeter of the base sidewall.

The base sidewalls extend continuously about the entire perimeter of the base. In example and preferred embodiments useful with a cover as described herein, with a snap-fit engagement between the cover and the base, a base sidewall can include a vertically-extending upper sidewall surface ("upper sidewall), a vertically-extending lower sidewall surface ("lower sidewall"), a sidewall top, and a horizontally-extending shoulder surface ("horizontal shoulder surface") that extends horizontally as part of the sidewall at a location that is vertically between the top and the bottom of the sidewall along the vertical height of the sidewall. The horizontal shoulder surface extends horizontally as part of the outer sidewall surface and extends continuously around the entire perimeter of the base. The horizontal shoulder surface connects at an inner edge to a lower portion (or lower edge) of the upper sidewall at an interior shoulder corner; the horizontal shoulder surface connects at an outer edge to an upper portion (or upper edge) of the lower sidewall at an exterior shoulder corner.

In this example, a joint can be formed between the outer sidewall surface at the horizontal shoulder surface, and the lower portion of the lip. For example, with the cover and the base in an assembled condition, the lower portion (or "lower end") of the lip can be seated against the lower portion of the upper sidewall, the horizontal shoulder surface, or both. At that engagement, the lower end of the lip can form a joint with the shoulder of the base, which extends continuously around the assembly at the perimeter of the assembly. As described herein, a snap-fit engagement that includes an extension structure on one surface and an opposed recess structure on an opposed surface can be formed between an inner surface of the cover and an outer surface of the base sidewall. Also as described herein (infra), a weld, e.g., a friction-stir weld, can be formed at the joint, around the entire perimeter of the assembly, to produce a hermetic seal that extends entirely around the perimeter of the base and the cover. Optionally, the snap-fit engagement may be included as part of the joint that is processed (stirred and softened) to form the friction stir weld, in which case the snap-fit engagement is does not survive after the welding process. In other instances, the snap-fit engagement may be a distance separated from the joint, and the friction stir weld occurs away from the snap-fit engagement and does not disrupt the snap-fit engagement; the snap-fit engagement then survives after the welding process.

A hard disk drive as described can include features and structures of conventional hard disk drive products, such as: a metal base that defines an interior, e.g., a "cavity" defined by a horizontally-extending bottom and vertically-extending sidewalls at a perimeter of the base; interior components at the interior; and a cover that encloses the interior and the interior components. The cover is as described herein, e.g., includes a snap-fit engagement with the base, and only that single cover is required according to useful and preferred devices. The interior components may include, for example: a stack of rotatable magnetic recording disks, reading and recording heads attached to armatures, an actuator to move one or more armatures, one or more motors, optional filters or an environmental control module, and electronic components adapted to control the interior components and communicate and transfer electronic data to and from an external electronic device. The interior contains the interior components of the hard disk drive, and may be filled with a low density gaseous atmosphere (e.g., a helium atmosphere).

Referring now to FIGS. 1A through 1E, these show example assemblies and details thereof. Referring first to FIG. 1A, example metal cover 20 includes horizontally-extending top portion 22 having a perimeter from which cover lip 24 extends in a downward vertical direction (i.e., at least substantially or approximately vertical with reference to horizontally extending top portion 22). FIG. 1B shows example metal base 12, which includes a horizontally-extending bottom 14 having a perimeter from which sidewalls 16 extend in an upward (vertical) direction (i.e., at least substantially or approximately vertical with reference to horizontally-extending bottom 14). Base cavity ("interior") 15 is defined by bottom 14 and sidewalls 16. Within base cavity 15 can be located internal working components of an electronic device, such as example components of an operational hard disk drive that include, e.g., multiple stacked magnetic recording disks, appurtenant electronics, mechanical actuating mechanisms, motors, environmental control devices, read-write heads, etc.

Referring to FIGS. 1C and 1D, assembly 90 is made by placing cover 20 over base 12 to form joint 44 around a perimeter of assembly 90. Snap-fit engagement 48 is present at between the inner surface of cover lip 24, and outer surface of sidewall 16 above joint 44. A permanent hermetic seal between the cover and the base can be formed at joint 44 by welding, e.g., by friction stir welding along the length of joint 44.

FIG. 1E shows a magnified view of components of joint 44 and snap-fit engagement 48. As illustrated, the outer surface of base sidewall 16 includes extension connector 50, and the inner surface of cover lip 24 includes recess connector 52. In the assembled form of the cover and base, extension connector 50 fits securely within the space of recess connector 52 to form a temporary, removable engagement and air-tight seal between the cover and the base.

Figure 2A:
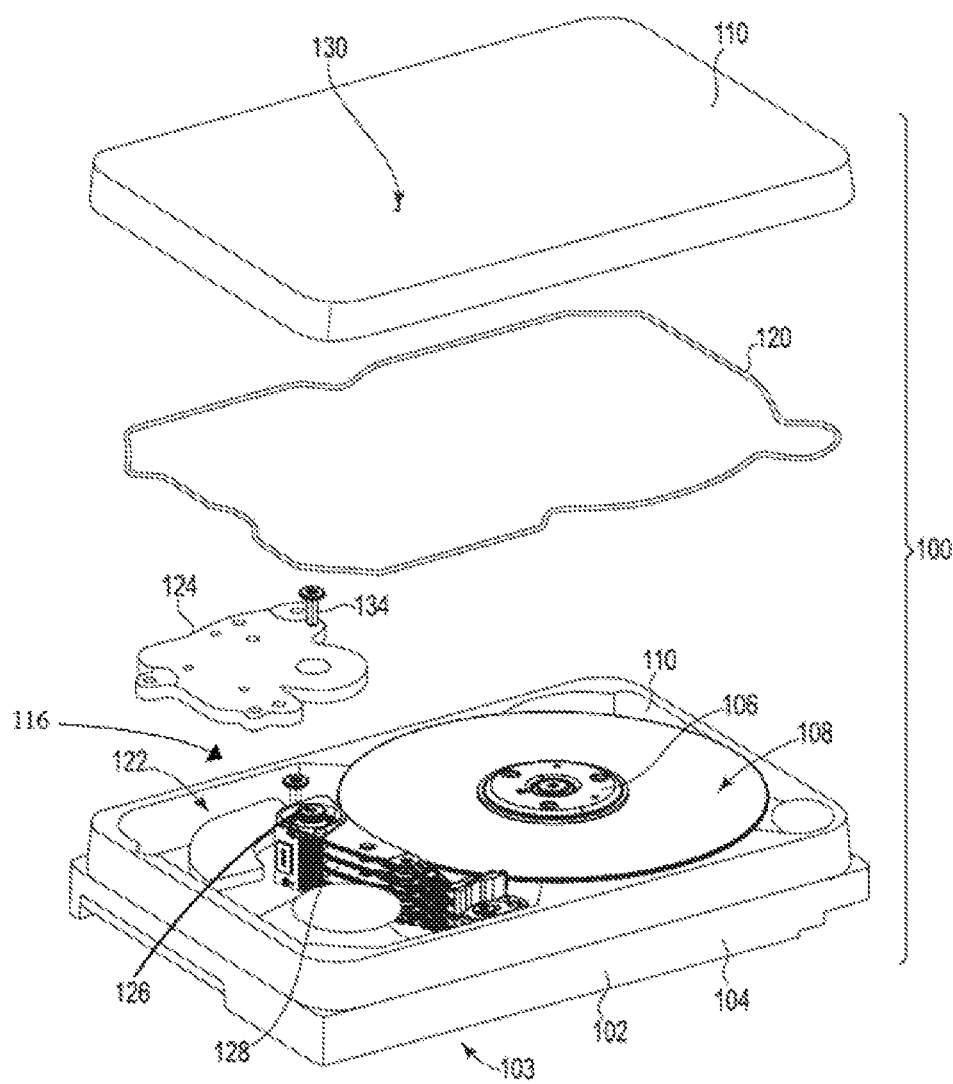
FIG. 2A shows an example of a hard disk drive as described.
Figure 2B:
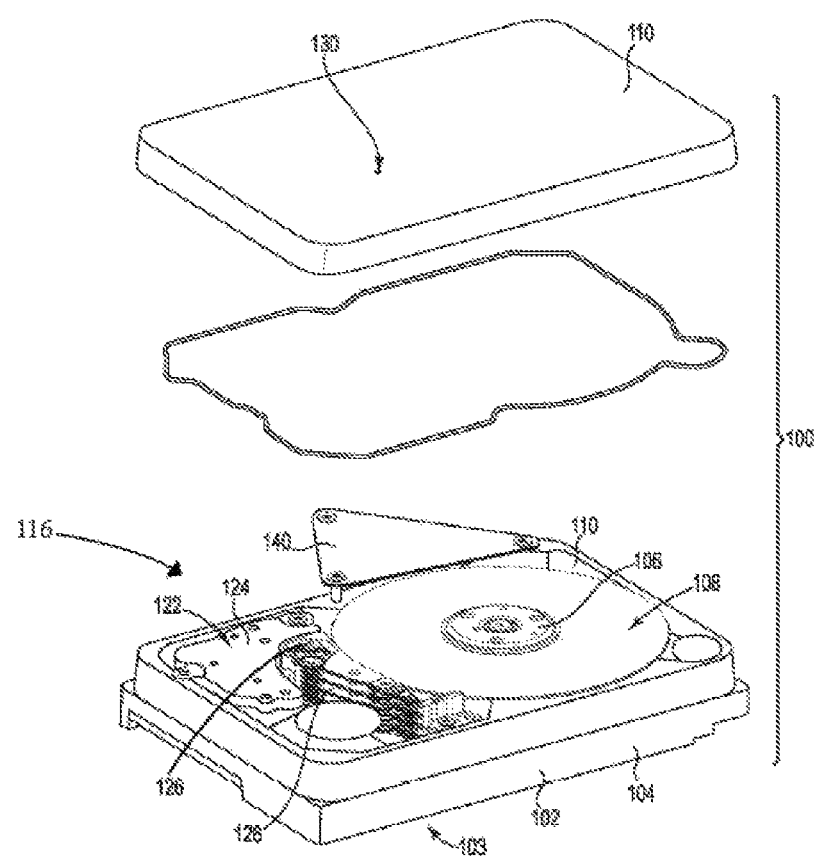
FIG. 2B shows an example of a hard disk drive as described.

Example of hard disk drives according to the present description is illustrated at FIGS. 2A and 2B. FIG. 2A (exploded view) shows example hard disk drive 100, which includes base 102 to which various interior components of disk drive 100 are mounted for operation, either directly or indirectly. Base 102 includes a flat or planar horizontally-extending bottom 103 (not shown) having a perimeter, with base sidewalls 104 extending from the bottom at the perimeter in a vertical direction. Cover 110 cooperates with base 102 to form a housing that defines enclosed interior 116. Cover 110, at the perimeter, engages base sidewalls 104 and is secured to the sidewalls by a snap-fit engagement as described herein, by a weld, or both. Optional gasket 120 can be included between a lower (bottom, interior) surface of cover 110 and a top surface of base sidewall 104.

Interior components of example hard disk drive 100 include a shaft or spindle 106 at a center or a hub of a hard disk assembly (HDA) 108. Information is written to and read from tracks on disks of assembly 108 through read-write heads and with the use of actuator assembly 122, which includes top pole 124. Actuator 122 rotates during use about a bearing shaft assembly 126 positioned adjacent to hard magnetic recording disk assembly 108. Actuator assembly 122 includes a plurality of actuator arms 128 (a.k.a. armatures) which extend toward disk stack 108. Mounted at a distal end of each arm 128 is a slider, which has a shape that causes the slider to fly in close proximity above a corresponding surface of an associated magnetic recording disk, during use.

According to example drive 100, cover 110 does not include openings or apertures other than an optional opening 130 through which a gaseous atmosphere of enclosed interior 116 may be removed (e.g., evacuated) or replaced (e.g., with a low density atmosphere), followed by sealing opening 130, e.g. using a flexible adhesive seal. As illustrated, top pole 124 is secured to an interior position of drive 100 using an internal fastener (screw) 134, which does not extend through cover 110.

FIG. 2B shows an alternative example hard disk drive 100. This example includes brace 140. Brace 140 is a rigid (e.g., metal) plate that is internal to disk drive 100 and is secured (e.g., using an internal fastener such as a screw) to base 100 at one corner, to hub 106 at a second corner, and to actuator assembly 122 (e.g., through top pole 124) at a third corner. Example brace 140 includes three corners and three internal fasteners. In alternate embodiments, a brace could instead include two ends and two internal fasteners, and extend, e.g., between a fastener at base 102 and a second fastener at hub 106, or between a first fastener at base 102 and a second fastener at actuator assembly 122.

With the assembly containing operational working components (that have passed performance testing) and a low density atmosphere, the assembled cover and base can be processed to permanently secure the cover to the base, for example by welding, preferably by forming a friction stir weld along the entire length of the joint formed between the cover and the base, meaning around the entire perimeter of the assembly.

The weld can be effective to hermetically seal the enclosure and contain the low density atmosphere (e.g., helium) inside of the enclosure while preventing other gases at an exterior of the enclosure from entering the enclosure. Example hermetically sealed enclosures that include a friction stir weld to seal the cover to the base can allow for not more than a very low rate of leakage from the enclosure, for example a rate of loss by leakage that is less than 1 percent of a volume of atmosphere (gas, e.g., helium) present within the enclosure per year.

Friction stir welding of a metal (e.g., aluminum) base to a metal (e.g., aluminum) cover at a joint formed between the two can be performed by rotating a friction stir weld tool and contacting the rotating tool to the joint, with pressure. The rotating tool generates heat at the joint to soften and cause flow of the metal materials at the location of the joint. Specifically, the rotating tool heats and mechanically mixes and joins the two metal materials of the base and the cover, at the joint, using mechanical pressure to soften portions of the metal materials, and to mix or blend softened metal materials. The softened and mixed metal materials subsequently cool to form the finished friction stir weld.

Figure 3:
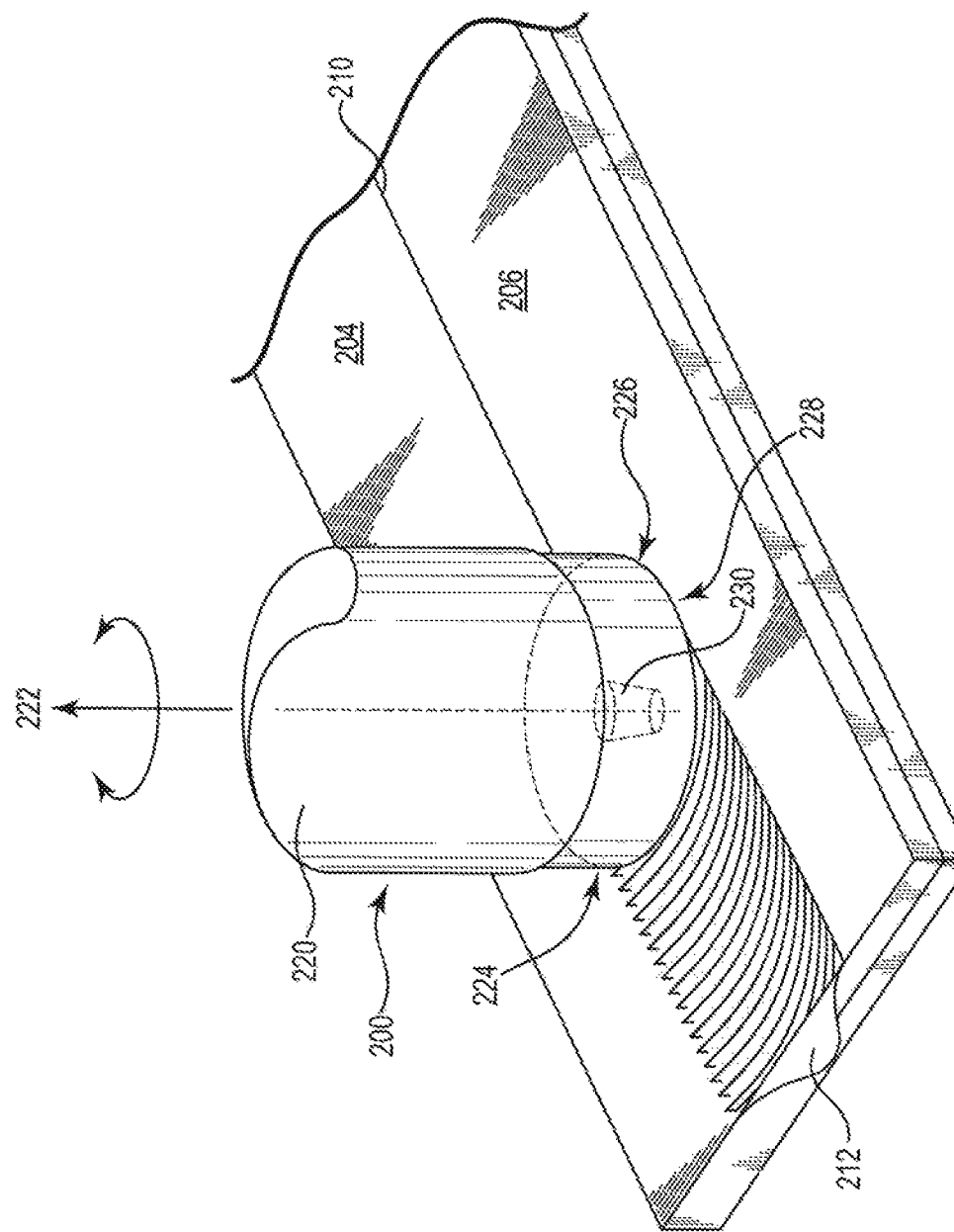
FIG. 3 shows an example friction stir weld step as described.

Referring to FIG. 3, a method of friction stir welding a joint as described can be performed by providing tool 200 for forming a friction stir weld and rotating the tool, while applying pressure at joint 210, to form a friction stir weld 212. A first metal component 204, e.g., an aluminum base, and a second metal component 206, e.g., an aluminum cover, meet at adjacent edges to form joint 210. Tool 200 includes support body 220 having longitudinal axis 222 and distal end 224. Distal end 224 includes distal face 228 (held against a top surface of joint 210) adapted to contact surfaces of metal pieces 204 and 206 at joint 210 during friction stir welding. Distal face 228 is centered on axis 222 and extends laterally to a perimeter of support body 220 centered on axis 222. Extending in a distal direction from distal face 228, along axis 222, is pin 230, which extends into first and second metal pieces 204 and 206 at joint 210 during friction stir welding.

During formation of a friction stir weld (212) along a length of a joint 210, distal face 228 of tool 200 is placed in contact with surfaces of metal pieces 204 and 206 at joint 210. Pressure from tool 200 is applied to joint 210 as tool 200 is rotated to soften (without melting) the aluminum of cover 206 and the aluminum of base 204. As tool 200 moves along joint 210, friction stir weld 212 is formed. The tool (i.e., along axis 222) may be held at an angle relative to surfaces of pieces 204 and 206, and not precisely perpendicular to the surfaces. The angle may produce a tilt in a direction that aligns with the direction of motion of the tool, with the upper portion of the tool being tilted backward and the distal face being tilted to face a direction of forward movement of tool 200. The size of the angle may be relatively small, e.g., not more than 10 degrees from perpendicular.

Parameters of a useful step of forming a friction stir weld can be any that are useful to produce a desired friction stir weld. Examples of parameters that can be selected and controlled include rotation speed of the tool, downforce of the tool against the workpiece, speed of the tool along the length of the joint (i.e., speed of forming the weld in a length-wise direction, also referred to as translational speed), an angle of the tool relative to the workpiece (e.g., from 0 or 1 up to 10 degrees), as well as the shape of the tool and the dimensions of the tool such as the diameter of the tool at the distal face and the diameter and the length of the pin (pin length being measured along the axis of the tool from the distal face).

A depth of a friction stir weld will typically be slightly greater than a length of a pin extending from the distal face of a tool used to form the weld. A desired depth of a weld as described herein is at least as deep as, preferably deeper than, the thickness of cover that forms the joint. To form a weld of this depth, the length of the pin should be at least as long as the thickness of the lip (at the joint) and at least as long as the width of the horizontal shoulder surface of the joint, e.g., at least 5, 10, 20, or 30 percent greater than one or both of those dimensions.

During formation of the weld, the tool can be rotated at a speed that is useful to add sufficient energy to the two metal components of a joint to soften both of the metal pieces and allow mixing of the components by the rotating tool. Useful and preferred rotational speeds of a tool to form a friction stir weld as described can be at least 1,000 revolutions per minute (rpm), e.g., at least 8,000 rpm, or at least 10,000, or 12,000 rpm, and up to about 25,000 or 30,000 rpm.

During formation of the weld, the tool, i.e., at the distal face, can apply a downforce to the two metal components at the joint in a direction along the axis of the tool. Any amount of downforce can be used that will be effective in forming a desired weld in an efficient manner. Examples of a useful downforce may be less than about 800 pounds (force) e.g., less than 500 pounds (force) or less than 300 or 200 pounds (force).

During formation of the weld a tool may be moved along a joint in a lengthwise direction at any useful speed, preferably a speed that will efficiently form a high quality weld. Examples of useful speeds (translational speed) of a tool along a joint during formation of a friction stir weld can be in a range from about 40 to 400 millimeters per second (mm/s), e.g., from 50 to 250 mm/s or from 70 to 150 mm/s.

Figure 4:
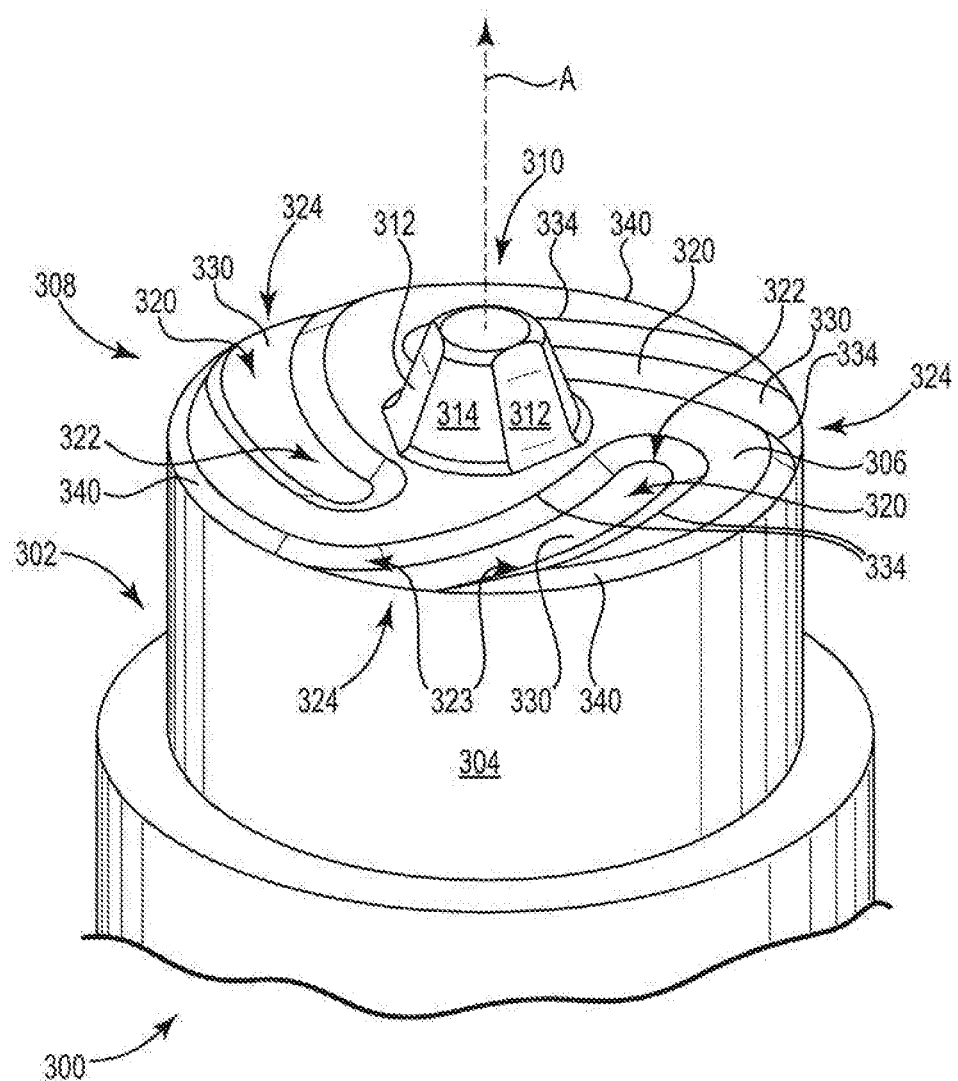
FIG. 4 shows an example of a friction stir weld tool.

An example of a useful tool is shown at FIG. 4. As illustrated, tool 300 includes support body 302 that has a longitudinal axis (A), outer surface 304 centered on the axis, and distal face 306 centered on the axis and extending from the axis laterally to perimeter 308 of distal face 306 and support body 302. Pin 310 extends from distal face 306 in a direction along the axis and distally from distal face 306.

Distal face 306, exemplary as illustrated, includes a scroll pattern that includes at least two arcuate (when viewed in a direction of axis A) grooves 320 formed in distal face 306. Each groove 320 extends from a groove start location 322 located between the axis and perimeter 308, to a groove end segment 324 at perimeter 308. A depth of each groove in distal face 306 may be shaped as desired, with useful or preferred grooves having a maximum depth in a range from 0.05 to 0.5 millimeters relative to the surface of distal face 306. Preferred grooves can have a shape (when viewed in cross section in a plane that includes the axis) that includes a bottom 330 (at a maximum depth of the groove) and sidewalls 323 that extend from bottom 330 to opposed distal (e.g., upper) edges 334 of each groove 320, where each groove 320 meets distal face 306 at a cornered edge. The shape of preferred grooves can include sidewalls 322 that are curved or angled (e.g., chamfered) relative to the direction of axis A, i.e., not parallel to axis A. In cross section, a useful or preferred sidewall can have a surface that is considered to extend along a line that is non-parallel to the axis, for example along a line that forms an angle with the axis that is in a range from 30 to 60 degrees. Curved or chamfered sidewalls 332 differ from sidewalls that are vertical, meaning sidewalls that extend in a direction that is parallel to axis A.

As illustrated, tool 300 includes three chamfered shoulder segments 340 that extend along perimeter 308 between three groove end segments 324. Each chamfered shoulder segment 340 extends along perimeter 308 between two adjacent groove end segments 324. Each chamfered shoulder segment 340 includes a surface that connects and extends between distal face 306 and a distal end of outer surface 304 of support body 302, with each surface extending in a direction that includes a directional component that is the parallel with the axis. In cross section in a plane of the axis, each chamfered shoulder segment surface can be considered to extend along a line that is non-parallel to the axis, for example along a line that forms an angle with the axis that is in a range from 30 to 60 degrees.

Pin 310 can have any structure, shape, or form that will provide desired performance of tool 300 when used for friction stir welding. Useful and preferred examples of shapes of pin 310 can include multiple outer surfaces (e.g., sidewalls) that include three or more facets 312, which are flat or planar surfaces that can preferably be oriented to be non-parallel to axis A. Facets 312 may be connected to adjacent facets or may optionally be interrupted by rounded portions 314. The number of facets on a pin can be as desired and useful, e.g., at least 3, and up to 5, 6, 8, or more. Distal pin end (the portion of pin 310 that is farthest away from distal face 306) of pin 310 can be flat and planar, i.e., perpendicular relative to axis A or may be cornered, angular, or substantially sharp, e.g., if formed by an intersection of facets 312.

Specific dimensions of a tool as described can be any that are useful for forming a friction stir weld. Useful sizes of a support body (e.g., diameter at a distal face), grooves, and a pin of a tool can be comparable to tools that have previously been useful for forming friction stir welds. According to certain embodiments of tools of the present description, however, a tool may have relatively smaller features sizes, which may allow a tool to be useful to form friction stir welds with potentially advantageous operating parameters, for example by use of a relatively higher tool rotational speed (rpm), relatively higher translational speed, a reduced downforce, or two or more of these.

The invention claimed is:

1. A method of closing an enclosure of an electronic device, the enclosure comprising:
   a metal base comprising:
      a horizontal bottom and a base cavity defined by the bottom and vertical base sidewalls at a base perimeter, and
      an outer sidewall surface extending along the base perimeter;
   a metal cover located over the base to enclose the base cavity and define an interior, the cover including a horizontal top portion extending over the base and a lip at a cover perimeter, the lip extending in a vertical direction relative to the horizontal top portion, the lip including a lower lip portion that contacts the outer sidewall surface when the cover is installed over the base; and
   a snap-fit engagement between the lip and the outer sidewall surface, the method comprising:
   installing the cover over the base to form the snap-fit engagement.

2. A method of claim 1 comprising:
   with the cover installed over the base, evacuating the interior,
   filling the evacuated interior with a low density gaseous atmosphere, and
   testing interior components of the electronic device.

3. A method of claim 2 comprising after the testing:
   removing the cover and repairing or replacing a component at the interior, or
   forming a friction stir weld at the device perimeter to weld the lower lip portion to the outer sidewall.

4. A method of claim 1 comprising, after the testing, forming a friction stir weld at the device perimeter to weld the lower lip portion to the outer sidewall.

5. A method of claim 1 wherein the cover does not include an aperture with a fastener through the aperture to secure an interior component.

6. A method of claim 1 wherein the enclosure comprises a brace at the interior to secure a motor spindle, an armature assembly pivot, or both, to the base sidewall.

7. A method of claim 1 wherein the enclosure comprises a gasket between an interior surface of the cover and an upper surface of the base sidewall.

8. A method of claim 1 wherein the lower lip portion has a thickness in a range from 10 to 40 mils.

9. A method of claim 1 wherein the enclosure includes the cover located over the base to enclose the base cavity, and no additional cover between the cover and the base cavity.

10. A method of forming a friction stir weld on an enclosure, the enclosure comprising:

a metal base comprising:

a horizontal bottom and a base cavity defined by the bottom and vertical base sidewalls at a base perimeter, an outer sidewall surface extending along the base perimeter that includes a shoulder, an upper sidewall surface above the shoulder, and a lower sidewall surface below the shoulder, the shoulder comprising a lower portion of the upper sidewall surface connecting to a horizontal shoulder surface at an interior shoulder corner, the horizontal shoulder surface extending horizontally from the interior shoulder corner to an exterior shoulder corner, and an upper portion of the lower sidewall surface extending vertically from the exterior shoulder corner;

a cover located over the base to enclose the base cavity and define an interior, the cover including a horizontal top portion extending over the base and a lip at a cover perimeter, the lip extending in a vertical direction relative to the horizontal top portion, the lip including a lower lip portion that contacts the shoulder to form a joint when the cover is installed over the base; and a snap-fit engagement between the lower lip portion and the lower portion of the upper sidewall;

the method comprising:

contacting the joint with a rotating friction stir weld tool and forming the friction stir weld on the joint, the tool comprising a support body having a longitudinal axis and a distal end, a distal face at the distal end, and a pin extending from the distal face along the axis, and rotating the tool about the axis while the distal face contacts the joint.

11. A method of claim 10 wherein the tool comprises a scroll pattern in the distal face, the scroll pattern comprising multiple arcuate grooves in the distal face, each groove extending from a groove start location located between the axis and a distal face perimeter, to a groove end segment at the distal face perimeter.

12. A method of claim 11 wherein:

the distal face perimeter has a diameter in a range from 2 to 10 millimeters, the pin has a length along the axis in a range from 0.1 to 1.5 millimeters, or both.

13. A method of claim 10 comprising rotating the tool at a speed of at least 5,000 revolutions per minute.

14. A method of claim 10 comprising, during forming the friction stir weld, applying downforce in a direction of the axis from the tool to the enclosure, the downforce being less than 1,000 newtons.

15. A method of claim 10 further comprising:

installing the cover over the base to form the snap-fit engagement, with the cover installed over the base, evacuating the interior, filling the evacuated interior with a low density gaseous atmosphere, testing interior components of the electronic device in the low density gaseous atmosphere.

16. A method of claim 15 comprising after the testing:

removing the cover and repairing or replacing a component at the interior, or forming a friction stir weld at the device perimeter to weld the lower lip portion to the outer sidewall.

\* \* \* \* \*